Nov. 15, 1938. S. S. MARTIN 2,136,516
ATTACHMENT FOR VEGETABLE DIGGERS
Filed Oct. 8, 1937

Stanley S. Martin, Inventor

Patented Nov. 15, 1938

2,136,516

UNITED STATES PATENT OFFICE 2,136,516

ATTACHMENT FOR VEGETABLE DIGGERS

Stanley S. Martin, Dexter, Maine

Application October 8, 1937, Serial No. 168,063

11 Claims. (Cl. 55—51)

This invention is a novel attachment for potato or vegetable diggers or the like, and the principal object of the invention is to provide an attachment in the nature of a flexible, resilient catch for diggers or like machines adapted to prevent the vegetable discharged from the delivery end of the digger from becoming bruised; also to pile the discharged vegetables in uniform rows and thereby prevent the same when discharged from spreading over the ground as they are dropped thereon.

In the usual potato digger, the potatoes are mechanically extracted from the ground, then elevated and discharged through chutes at the rear of the machine. In order to keep the potatoes from spreading over the ground as they are discharged thereon, metallic pan-shaped catches are usually provided at each side of the discharge end of the chute which are slightly elevated from the ground and into which the potatoes fall before being deposited on the ground.

Some disadvantages are observed by the use of these metallic catches; first, they are rigidly fixed to the digger with the result that the potatoes tend to pile up in them, and thus instead of the potatoes being distributed evenly in rows, some potatoes roll away in both directions from the rows, so that on the next trip of the digger many potatoes are lost or injured by being ground under the digger. A second disadvantage occasioned by these catches is that the potatoes often become bruised by the drop into the catches; and a further disadvantage is that when the digger has to be backed for the purpose of turning around, or for any other reason, said metallic catches often become bent by contact with the ground especially if the ground is uneven.

My novel catch overcomes the disadvantages of these metallic catches, above mentioned, since the same is formed of flexible, resilient material, and due to the teetering of the material as the potatoes drop therein, no piling-up of the potatoes is possible, and furthermore, due to the use of flexible material, no bruising of the potatoes is possible, and the potatoes drop off the catches and are deposited in even rows without rolling out of line.

I will explain the invention with reference to the accompanying drawing which illustrates one practical embodiment thereof to enable others to adopt and use the same; and will summarize in the claims, the novel features of construction, and novel combinations of parts, for which protection is desired.

In said drawing:—

Figure 1:
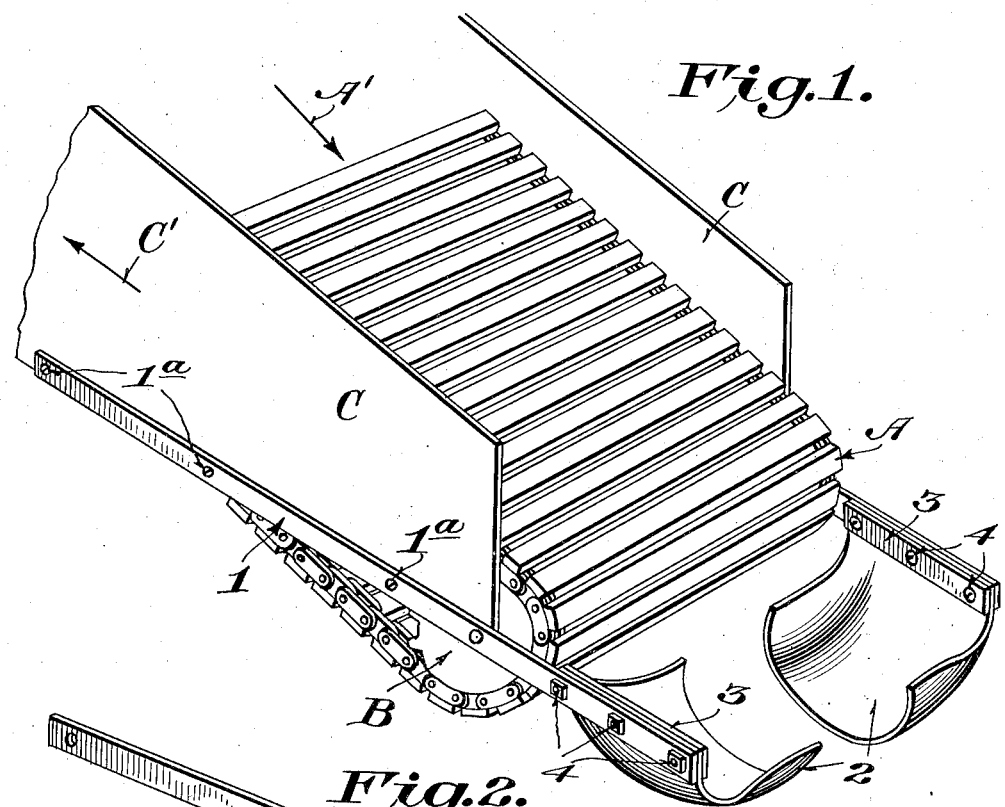
Fig. 1 is a perspective view of the rear end of the discharge chute of a conventional potato digger showing my novel flexible catches arranged at each side of the discharge end thereof.
Figure 2:
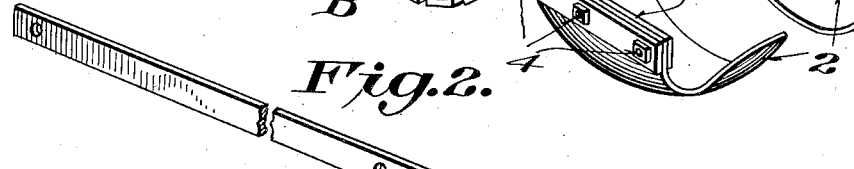
Fig. 2 is an enlarged perspective view of one catch, detached.
Figure 3:
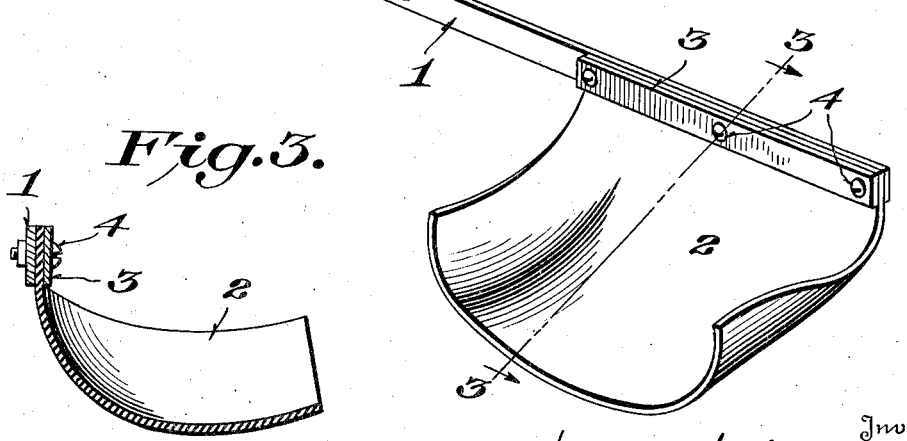
Fig. 3 is a transverse section on the line 3—3, Fig. 2.

My invention is illustrated in connection with a conventional potato digger, the discharge chute of which consists of an endless conveyor A (Fig. 1) running over a rear conveyor sprocket B, driven by suitable means (not shown), side members C being provided at opposite sides of the conveyor A whereby as the digger is drawn in the direction of the arrow C' (Fig. 1) the chute is moved in the direction of arrow A' (Fig. 1) and the potatoes discharged over the sprocket B from which they would normally fall onto the ground surface. The particular construction of the potato digger or chute A—C however forms no part of my present invention.

Extending rearwardly from the lower edge of each side member C is a strap 1 attached by bolts 1a or the like, said strap forming part of my novel catch attachment; and extending inwardly from the projecting portions of straps 1 are opposed resilient flexible scoop-like members 2 disposed slightly above the ground surface adapted to catch the potatoes discharged from the conveyor A, said scoop-like members being preferably formed of rubber and are concavo-convex in shape, and are secured to the straps 1 between bars 3 which are bolted or otherwise secured as at 4 to the inner faces of the straps. The inner edges of the scoop-like members 2 are of substantial U-shape, and are spaced sufficiently apart to permit the potatoes to drop off in even rows without "running off", i. e., rolling unduly away from the piles or rows.

The construction of the flexible scoop-shaped members 2 gives sufficient strength to sustain a considerable load because of their shape. Should the members become overloaded they will yieldably sag enough to allow the excess potatoes to slide off. Consequently the members 2 can be made longer than a rigid metallic catch so as to carry the potatoes farther inwardly toward the center of the row. Also, as the members are not made of rigid material, the potatoes dropping therein will start a vibratory or teetering motion in the members, which motion helps to keep the members clear of excess potatoes, and also as the members are made of resilient material the potatoes will not be bruised or injured when dropping thereinto.

The use of novel catches results in a very marked improvement over any type of "catches" known, and I do not limit my catches to use only in connection with potato diggers, for same may be used on various other machines having carriers or elevators, or used in any place where the fall of dropping objects on a receiving surface should be cushioned as the objects are guided. Also the details of the attachments may be varied within the scope of the claims.

I claim:—

1. An attachment for vegetable diggers or the like comprising a pair of supports; and scoop-shaped members of flexible material each carried by a support.

2. In an attachment as set forth in claim 1, each member being of rubber of concavo-convex form.

3. An attachment for vegetable diggers or the like comprising a pair of supports; and scoop-shaped members of flexible material each having one end secured to a support, the other ends of the members being substantially U-shaped.

4. In an attachment as set forth in claim 3, a clamp secured to each support and confining the end of the member between the support and clamp.

5. In an attachment as set forth in claim 3, each member being of rubber of concavo-convex form.

6. In combination, a traversing discharge chute for dropping articles on a receiving surface; opposed flexible scoop-shaped members at each side of the chute receiving the articles therefrom; said members being disposed adjacent the receiving surface and spaced apart to deposit the articles in even rows as the chute traverses.

7. In a combination as set forth in claim 6, said members being of rubber of concavo-convex form.

8. In a combination as set forth in claim 6, supports extending from the chute, and said members projecting laterally from the supports; clamp means secured to the supports and confining the edges of the members between the supports and clamps.

9. In combination, a vegetable digger having a discharge chute for dropping vegetables onto the ground; opposed flexible scoop-shaped catches at each side of the chute receiving the dropping vegetables; said catches being disposed adjacent the ground surface and spaced apart to cause the vegetables to be deposited in even rows as the digger moves.

10. In a combination as set forth in claim 9, said members being of rubber of concavo-convex form.

11. In a combination as set forth in claim 9, straps extending from the chute, said straps carrying the members projecting laterally therefrom; and clamp means secured to the straps and confining the edges of the members between the straps and clamps.

STANLEY S. MARTIN.